United States Patent [19]

Corsi et al.

[11] Patent Number: 5,141,783
[45] Date of Patent: Aug. 25, 1992

[54] APPLICATION OF COMPOSITE, ANTI-ADHESIVE FILMS USED AS SUPPORT BASES FOR THE FORMATION OF AT LEAST ONE POLYURETHANE LAYER USABLE IN SAFETY WINDOWS

[75] Inventors: M. Philippe Corsi, Lyons; Sylviane Traversier, Caluire, both of France

[73] Assignee: Saint-Gobain Vitrage International c/o Saint-Gobain Recherche, Aubervilliers Cedex, France

[21] Appl. No.: 617,091

[22] Filed: Nov. 23, 1990

[30] Foreign Application Priority Data

Nov. 23, 1989 [FR] France ................. 89 15392
Nov. 23, 1989 [FR] France ................. 89 15393

[51] Int. Cl.$^5$ .................... B05D 1/36; B05D 7/00
[52] U.S. Cl. .................. 427/412.5; 427/160; 427/164; 427/40; 427/322; 264/213
[58] Field of Search ............ 427/412.5, 160, 164, 427/40, 322; 264/213

[56] References Cited

U.S. PATENT DOCUMENTS

| | | | |
|---|---|---|---|
| 3,983,301 | 9/1976 | Cook et al. | 427/412.5 |
| 4,232,080 | 11/1980 | Orain et al. | 427/165 |
| 4,331,736 | 5/1982 | Schäfer et al. | 427/412.5 |
| 4,605,528 | 8/1986 | Petitcollin et al. | 264/316 |
| 4,643,944 | 2/1987 | Agethen et al. | 427/177 |
| 4,652,494 | 3/1987 | Bravet et al. | 264/331.19 |
| 4,749,586 | 6/1988 | Bravet et al. | 427/160 |
| 4,880,700 | 11/1989 | Charmot et al. | 428/337 |
| 4,883,706 | 11/1989 | Grosjean | 428/332 |
| 4,983,461 | 1/1991 | Daube et al. | 427/163 |

FOREIGN PATENT DOCUMENTS

| | | |
|---|---|---|
| 1207646 | 9/1959 | France . |
| 52-087482 | 7/1977 | Japan . |
| 52-121063 | 10/1977 | Japan . |

OTHER PUBLICATIONS

Derwent Abstract #77-83635y of Japanese Patent J 52121063 of Oct. 1977.
Derwent Abstract 77-63542y of Japanese Patent J52087482 of Jul. 1977.

Primary Examiner—Michael Lusignan
Assistant Examiner—D. L. Dudash
Attorney, Agent, or Firm—Oblon, Spivak, McClelland, Maier & Neustadt

[57] ABSTRACT

The invention relates to an anti-adhesive polyester film comprising polyester film support base having a semi-crystalline orientation, which comprises, on at least its surface designed to receive the liquid mass, a coating comprising a fluorine-containing polymer. This application also relates to a method of forming a polyurethane layer onto an adhesive layer and the resulting polyurethane layer.

31 Claims, No Drawings

APPLICATION OF COMPOSITE, ANTI-ADHESIVE FILMS USED AS SUPPORT BASES FOR THE FORMATION OF AT LEAST ONE POLYURETHANE LAYER USABLE IN SAFETY WINDOWS

BACKGROUND OF THE INVENTION

1. Field of the Invention

The present invention relates to a new anti-adhesive composite polyester films as temporary support bases for the manufacture of polymer films, and in particular, for the manufacture of least one polyurethane layer possessing excellent optical quality and suitable for use in safety windows.

2. Discussion of the Background

It is known that plastic sheets or films meeting specific physical property requirements (in particular, resistance to scratches, transparency, surface condition, capacity for self-healing of scratches, resistance to tearing) are used for the manufacture of laminated windows, called "asymmetrical" windows, which comprise a monolithic or laminated support base made of glass and/or plastic, and said plastic sheet. These windows can be used in buildings, motorized vehicles, safety lenses. etc. Thus, French Patents 2 187 719 and 2 251 608, and European Patent 0 132 198, for example, propose placing over the glass sheet intended to be positioned to the inside of the vehicle passenger area, an elastic cross-linked polyurethane layer, termed a thermo-hardenable polyurethane layer or layer possessing surface properties, which has excellent anti-tear and self-healing properties or which can cause accidental scratches to be removed. The polyurethane layer can be used by itself or in association with another layer having adhesive and/or energy-absorbing properties, especially a thermoplastic polyurethane layer or a polyurethane layer obtained by means of reactive pouring or spraying of a mixture of reactive compounds, as described in the above-mentioned European Patent Publication No. 0 132 198.

These polyurethane layers must be of high optical quality and, in particular, must possess no surface defects. High optical quality signifies, according to the invention, the optical quality required to use these layers in the windows of transportation vehicles.

Proposals have already been offered suggesting the manufacture of these layers by pouring the liquid mass containing polyurethane precursors on a flexible, stretched plastic support base which is fed from rollers as the pouring takes place. When the thermo-hardenable polyurethane layer is formed, it can be immediately detached from the temporary plastic support base or may preferably be wound together with said support, which then acts as a protective film until its final use.

When the polyurethane film comprises a thermo-hardenable layer and a layer possessing adhesive and/or energy-absorbing properties (designated hereinafter as the EA layer), the precursors of these layers are poured successively in any order whatever, so that the temporary support base can come into contact either with the EA layer or with the thermo-hardenable layer.

The plastic material forming the temporary support base must meet various requirements as regards its surface state, its chemical inertness with respect to the polyurethane precursors, its elasticity, its capacity to be wound, and its capacity to be easily detached from the polyurethane sheet when traction is exerted on it, all the while preserving a high degree of adhesiveness in the absence of traction. The polyester films which meet a number of these requirements have been proposed as temporary support bases for polyurethane sheets, whether composite or not, for example in French Patent Publications 2 480 669 and 2 546 810. However, the polyurethane films do not achieve a desirable compromise between sufficient adherence to the polyurethane film and the capacity for easy detachment when traction is applied to the support film. The Applicants have thus set for itself the objective of using a new composite polyester film as a temporary support base for polyurethane films which can be easily detached when traction is exerted, without damaging the surface of the polyurethane film, i.e., without tearing away this surface and/or without depositing on this surface material torn away from the temporary support film.

SUMMARY OF THE INVENTION

Accordingly, one object of the present invention relates to an anti-adhesive composite polyester film used as a support base for the formation of polyurethane films possessing high optical quality and suitable for use in the manufacture of safety windows, composed of a polyester support film having a semicrystalline orientation and on at least one surface of said support, a coating containing a fluorine-containing polymer.

The coating advantageously comprises a fluorine-containing polymer and a usable quantity of a water-dispersable polyester which is derived from at least one aromatic dicarboxylic acid and at least one diol, and comprising a multiplicity of sulfonyloxy groups having the general formula:

$(SO_3)_n M$.

where:
n is equal to 1 or 2;
M represents a hydrogen atom, an alkali or alkaline-earth metal, an ammonium cation, or a quaternary ammonium cation.

In a second embodiment, is provided a method of forming a polyurethane layer onto an anti-adhesive layer.

In a third embodiment, is provided a polyester film composite of an anti-adhesive layer and a polyurethane layer.

A fourth embodiment, provides a polyurethane sheet produced according to the claimed method.

DETAILED DESCRIPTION OF THE PREFERRED EMBODIMENTS

For the purposes of the present invention, the phrase "water dispersable" signifies polyesters that are water-soluble or polyesters which form stable dispersions in water.

The polyesters used to obtain the support base for composite films employed according to the invention are those which are habitually used to obtained bi-oriented semicrystalline films. These include film-forming, linear polyesters that can be crystallized by orientation and obtained in a conventional manner using several aromatic dicarboxylic acids or their derivatives (lower aliphatic alcohol esters, for example halides) and one or several aliphatic glycols. More specifically the polyester support film is composed of a polymer comprising at least 80% in mols of units derived from one aromatic dicarboxylic acid and from ethylene glycol. Phthalic acids may be mentioned as an example of aromatic diacids: terephthalic, isophthalic, naphthalene-dicarboxylic-2,5; and naphthalaen-dicarboxylic-2,6. These acids may be combined with a small quantity of one of several aliphatic dicarboxylic acids, such as adipic, azelaic, and hexahydroterephthalic acids. Non-limiting examples of aliphatic diols include ethylene glycol; propanediol-1,3; butanediol-1,4. These diols may be combined with a small quantity of one or several aliphatic diols in which the carbon is condensed to a higher degree (for example, neopentyglycol) or cyclo-aliphatics (cyclo-hexanedimethanol). Film-forming polyesters capable of crystallization include, preferably, polyterephthalates or alkylenediol polynaphthalenedicarboxylates and, in particular, ethylene glycol or butanediol-1,4 polyterephthalate or co-polyesters containing at least 80 mol % of terephthalate or alkylene glycol naphthalene-dicarboxlyate units, preferably ethylene glycol terephthalate or ethylene glycol naphthalene-dicarboxylate units. The polyester is, advantageously, an ethylene glycol polyterephthalate whose intrinsic viscosity measured at 25° C. in o-chlorophenol ranges between 0.6 and 0.75 dl/g.

The polyester support films may themselves be simple or composite. Thus, use may be made of a coextruded polyester film in which one layer is loaded so as to impart to said layer a coarseness sufficient to ensure the finishing capacity of the entire unit and whose other layer is not loaded or which incorporates loads whose coarseness is selected so as not to produce any surface defect of the anti-adhesive coating. Use may alternatively be made of composite polyester films composed of a semi-crystalline oriented polyester film incorporating, over at least one of its surfaces, a primary adhesive coating deposited by coating or coextrusion procedures, such as those described in European Patent Applications Nos. 267 856; 275 801; 260 203; and 272 993. Particularly advantageous is a primary adhesive coating composed of a sulfonated co-polyester.

The loads in the polyester support films may be incorporated during polycondensation or in the polymer by means of conventional procedures; alternatively, they may be the result of the precipitation of catalytic residues as acted upon by additives introduced during polycondensation. The nature of these loads is not of critical importance; they may be mineral compounds (oxides or salts of the elements in groups II, III, and IV of the periodic table).

As illustrations, mention may be made of silicas, silicoaluminates, calcium carbonate, titanium oxide, magnesium oxide, aluminum oxide, barium sulfate, polystyrene preferably (cross-linked by means of divinylbenzene), and thermotropic polymers (especially polyester).

The load quantity and average particle diameter are selected so as to confer on the polyester support film surface properties (coarseness and coefficients of friction) sufficient to ensure that it can be effectively finished, without bringing about the appearance of surface defects on the anti-adhesive coating (B) caused by a transfer effect.

In general, the average particle diameter is less than 3 μm, and ranges preferably between 0.02 and 2 μm. The load amount is less than or equal to 1% of the weight of the polyester, and ranges preferably between 0.01 and 0.1%.

Support films are obtained using conventional film-forming procedures, including, in particular, the extrusion of a crystallizable amorphous polyester film, hardening followed by stretching, thermosetting, and the winding of the semicrystalline-oriented film.

The thickness of the polyester support films (A) may vary between 20 and 200 μm, and preferably between 30 and 150 μm.

An anti-adhesive layer is obtained depositing, on at least one of the surfaces of the support film, an aqueous compound, an emulsion or suspension, containing basically a fluorine-containing polymer or, advantageously, a mixture of:

a) a fluorine-containing polymer;

b) a water-dispersable polyester having sulfonyloxy groups.

The fluorine-containing polymers suited for the application of the invention may comprise, in particular, polymers and copolymers of vinylidene fluoride, of trifluorochloroethylene, of tetrafluoroethylene, of tetrafluorochloroethylene and of hexafluoropropylene among themselves or with non-fluorine-containing monomers (e.g., ethylene).

Vinylidene polyfluoride is particularly well suited. These fluorine-containing polymers may be used in powder or emulsison form or as aqueous dispersions, such as, for example, those obtained by polymerization in emulsion or suspension of the monomer(s). The dry extract content of the emulsions or dispersions of the fluorine-containing polymer is not a critical factor.

The water-dispersable polyesters containing sulfonyloxy groups combined with the fluorine-containing polymer are conventional products. A first group of water-dispersable polyesters includes those described in French Patent Nos. 1 401 581 and 1 602 002, and in European Patent Application 129 674. For the purposes of the present invention, the polyesters containing sulfonyloxy groups described in these patents may be used. More specifically, water-soluble or dispersable polyesters are obtained through the polycondensation of one or several aliphatic dicarboxylic diols with at least one or several aliphatic diols and at least one difunctional compound incorporating at least one sulfonyloxy group. Even more specifically, the dispersable polyester is a co-polyester comprising a multiplicity of units derived from at least two dicarboxylic acids, of which one contains at least one sulfonyloxy group in its molecule and a multiplicity of units derived from at least one sulfonyloxy group in its molecule and a multiplicity of units derived from at least one aliphatic diol. Hereinafter, to simplify the description, the term "sulfonyloxy group" will designate both hydroxysulfonyl groups and the alkali, alkaline earth, and ammonium salts derived from them.

The aromatic dicarboxylic acids that can be used to prepare water-dispersable polyesters include, as non-limiting examples, terephthalic, isophthalic, phthalic, naphthalenedicarboxylic-1,4, oxydibenzoic-4,4', bis (hydroxycarbonyl-4 phenyl) sulfone, and dihydroxycarbonyl-4,4'benzophenone acids. These acids may be used singly or in mixtures. Among those mentioned, preferential use is made of terephthalic, isophthalic acids and phthalic acid singly or in combinations with the other acids mentioned. Mixtures of terephthalic acids with one or several other aromatic dicarboxylic acids, and in particular with isophthalic acid, is particularly well suited for the production of water-dispersable polyesters that have undergone sulfonation. In this case, the quantity of terephthalic acid, expressed in moles, may range between 20 and 99% of the total number of moles of unsulfonated diacids, and preferably between 30 and 95%.

To prepare dispersable polyesters, aliphatic dicarboxylic acids comprising from 3 to 15 carbon atoms may be mixed with aromatic diacids. More specifically, all or a part of the aromatic acid used in combination with the terephthalic acid (e.g., isophthalic acid) may be replaced by aliphatic acids, such as adipic, suberic, sebacic, succinic, or dodecanedioic acid.

To prepare water-dispersable sulfonated polyesters, dicarboxylic acids may be replaced during polycondensation by their derivatives that are habitually used in this type of reaction, i.e., anhydrides, esters, or acid chlorides. Esters, and in particular methyl esters, are preferably used.

Examples of diols that may be used for the preparation of water-dispersable sulfonated polyesters include ethylene glycol; butanediol-1,4; butanediol-1,3; propanediol-1,3; propanediol-1,2; dimethyl-2,2 propanediol-1,3; pentanediol-1,5; hexandediol-1,6; diethylene glycol; triethylene glycol; neopentyl glycol; cyclohexanedimethanol; tetraethylene glycol; and penta-, hexa-, or deca-methylene glycol. Ethylene glycol and its oligomers are particularly well suited to the preparation of sulfonated polyesters. They may be used singly or in combinations and/or with other diols. Preference is given to mixtures of ethylene glycol and its oligomers having the formula HO—(CH$_2$—CH$_2$—O)$_n$H, in which n is a whole number between 2 and 10.

The sulfonyloxy groups having the formula —SO$_3$N are incorporated into the polyester by means of a difunctional compound having a sulfonyloxy group and capable of reacting with diacids and diols during polycondensation. Examples of monomers of this type are cited in French Patent No. 1 602 002. Preferential use is made of the salts of alkali metals of aromatic dicarboxylic acids possessing sulfonyloxy groups, such as those of sulfoterephthalic, sulfoisophthalic, preferably sulfo-5 isophthalic acid, sulfophthalic, hydroxysulfonyl-4, or naphthalenedicarboxylic-2,7 acids or of their derivatives, and, in particular, of their esters.

The quantity of the bifunctional compound having a sulfonyloxy group present in the sulufonated polyester, expressed in moles for a total of 100 moles of difunctional compounds of the same type, ranges preferably between 2 and 30 moles %. In general, quantities of difunctional sulfonated compounds ranging between 5 and 15 moles, for a total of 100 moles of difunctional compounds of the same type, prove suitable. Thus, when use is made of an alkali salt of hydroxysulfonyl-5 isophthalic acid, this compound may represent from 2 to 30 moles, for a total of 100 moles of dicarboxylic acid units in the polyester.

The water-dispersable polyesters previously described are obtained using conventional procedures, for example reaction of the diol(s) with a mixture of methyl esters of various required acids in the presence of conventional transesterification catalysts, followed by polycondensation of the diol esters thus obtained. The quantities of each of the reagents are calculated so that the ratio of the total number of the alcoholic hydroxyl groups to the total number of carboxylic groups will range preferably between 2 and 2.5.

A second group of water-dispersable polyesters possessing sulfonyloxy groups is composed of polyesters such as those previously described and as modified by grafting at least one acrylic monomer and possibly at least one other monomer unsaturated with ethylene. Modified polyesters of this kind and the procedure used to obtain them are described in European Patent No. 0 260 203.

The acrylic monomers used for the preparation of the modified polymers may be represented by the general formula:

in which:
R represents one hydrogen atom, a lower alkyl group, or a lower alkyl group substituted with a hydroxyl group;
Y represents a functional hydroxycarbonyl alkoxycarbonyl group corresponding to the formula —COOR$_1$, in which R$_1$ is C$_{1-20}$ linear alkyl, hydroxyl substituted C$_{1-20}$ linear alkyl, C$_{1-20}$ branched alkyl or hydroxyl substituted branched C$_{1-20}$ alkyl; nitrile; amide having the formula —CON(R$_2$)(R$_3$), wherein R$_2$ and R$_3$ are each independently an atom of hydrogen or a linear or branched alkyl group containing from 1 to 20 carbon atoms.

The term "lower alkyl radical" designates alkyl radicals containing from 1 to 4 carbon atoms.

Specific examples of R$_1$, R$_2$, and R$_3$ radicals include the radicals, methyl, ethyl, n-propyl, isopropyl, n-butyl, isobutyl, tert-butyl, n-pentyl, n-hexyl, ethyl-2 hexyl, decyls, dodecyls, octadecyls and eicosanyls. Hydroxyalkyl R$_1$ radicals include the radicals hydroxymethyl, hydroxy-2 ethyl, hydroxy-3 propyl, and hydroxy-4 butyl.

In formula (II), R preferably represents one atom of hydrogen or methyl or hydroxymethyl radicals.

Acrylic derivatives corresponding to formula (I) which may be used to prepare modified polymers include, among non-limiting examples, acrylic acid, methacrylic acid, acrylonitrile, methacrylonitrile, acrylamide, methacrylamide, N-methacrylamide, methyl acrylates and methacrylates, ethyl, n-propyl, isopropyl, n-butyl, isobutyl, ethyl-2 hexyl, and stearyl. These monomers may be used alone or in combinations with two or more acrylic derivatives. Examples of mixtures of acrylic derivatives include: methyl methacrylate/acrylic and/or methacrylic acid; methyl methacrylate/acrylic or methacrylic acid/ethyl acrylate; methyl methacrylate/ethyl acrylate/acrylamide or methacrylamide; acrylamide/methacrylamide; butyl acrylate/acrylic acid; butyl methacrylate/ethyl acrylate. Preferably the monomer is selected from the group consisting of methyl acrylate/methacrylate, ethyl acrylate/methacrylate, acrylic acid/methacrylic acid and acrylamide/methacrylamide.

Acrylic compounds may also be combined with a small quantity of one or several non-acrylic ethylenic monomers, such as vinyl acetate, vinylidene chloride, styrene, methylstyrene, crotonic, itaconic fumaric or maleic acid, and alkaline or alkaline-earth salts of ethylenic sulfonic acids, such as vinylsulfonic, allylsulfonic, methallylsulfonic and styrene-sulfonic acids. The quantity of the ethylenic, non-acrylic acid is calculated so that, in the copolymer obtained, the number of recurring units of this nonacrylic monomer, expressed in moles per 100 moles of acrylic monomer, is preferably less than or equal to 20% and, more preferably 10%.

Quantities of ethylenic units representing from 0.1 to 5% in moles are suitable.

While remaining within the scope of the invention, these monomers according to formula (II) may be combined with one or several monomers capable of causing cross-linking of the acrylic part. For this purpose, use may be made of polyethylenic monomers capable of cross-linking among themselves when subjected to the action of free radical generators during polymerization, or of monomers which cause the cross-linking of the acrylic portion when heated, for example during the coated film-production process or during a later thermal treatment of the coated film. Examples of polyethylenic monomers include diallyl phthalate, divinylbenzene, and diacrylates or dimethacrylates of diols, such as ethylene glycol dimethacrylate. Suitable cross-linking agents under the effect of heat include hydroxyalkyl(meth)acrylamides, such as N-methylolacrylamide and N-methylolmethacrylamide.

The quantity of the cross-linking monomer expressed as described above is up to 5% in moles, but preferably less than 5 moles per 100 moles, of non-cross-linking acrylic monomer. In general, it ranges between 0.1 and 3 moles %.

To prepare the modified polymers, use is made of conventional techniques of radical polymerization of monomers unsaturated with ethylene, in the aqueous phase. In general, polymerization occurs by dispersion of the acrylic monomer(s) in a suitable volume of water to which the required quantity of a dispersable sulfonated polyester; as the case requires, one or several conventional emulsifying agents are added. In fact, although the sulfonated polyester can itself act as an emulsifying agent allowing the dispersion of the monomer(s) in water, the use of the polyester does not exclude that of conventional surfactants, such as, for example the alkali salts of long-chain hydroxy sulfates (sodium laurylsulfate and ethanolamine laurylsulfate); the alkali salts of long-chain sulfonic acids; non-ionic emulsifying agents such as the polyoxyethylene glycols and their derivatives; and the alkoxylated, or possible sulfated, alkylphenols. Polymerization is initiated using conventional free radical generators, such as peroxide compounds: persulfates, oxygenated water, organic peroxides (peroxides of lauroyl and benzoyl and t-butyl hydroperoxide); azo compounds (azodiisobutyronitrile); oxidation-reduction systems combining a peroxide compound, preferably water-soluble, and a reductant: ferrous salts (sulfate), sulfites, or alkaline bisulfites.

Other conventional polymerization additives can be present in the reactive medium. Thus, the procedure may be carried out in the presence of conventional chain-limiting agents such as thiols (dodecylthiol, tetradecylthiol), so as to regulate the molecular weight of the copolymer obtained as a function of the properties desired for the coating.

The polymerization temperature may vary within broad limits. In general, a temperature of between 10° and 100° C., and preferably between 20° and 80° C., is suitable.

The study of the product resulting from the polymerization of at least one acrylic monomer, as described above, in the presence of a dispersable polyester, has made it possible to conclude that the polyester is chemically linked to the acrylic polymer. Without limiting the invention in any way to a specific reactive mechanism, it appears that the polyester and the acrylic monomer(s) react during polymerization, accompanied by the formation of a grafted polymer.

The concentration of the dispersable polymer and of the polymerizable monomer(s) in the aqueous phase of polymerization is not a critical factor, and may vary within wide limits. This concentration is chosen as a function of the proportion of solid materials desired for the final emulsion and of the degree of polymerization of the monomer(s) under conditions of polymerization.

The aqueous product obtained following polymerization may be used directly to obtain composite films according to the invention. It may also undergo various treatments. Thus, after polymerization, a procedure for the elimination of monomers not transformed by conventional means may be undertaken. When one or several reaction constituents comprise free acid functions, these latter may be neutralized by adding a mineral or organic base. Preference is given to the use of an alkali base (sodium carbonate or potassium), of a quaternary ammonium hydroxide, or of liquid ammonia. The functions may be sulfonic acid functions of the dispersable polyester and/or carboxylic acid functions of the acrylic (co)polymer. In addition, additives such as stabilizing or antistatic agents may be added to the emulsion thus obtained In one variant, conventional external crosslinking agents of the acrylic (co)polymers may be added.

The nature of the external cross-linking agents depends on the nature of the acrylic monomer(s). Preferred cross-linking agents include formo-phenolic resins and amine-formol resins such as the condensation products melamine/formol, urea/formol, and triazine/formol. The quantity of the cross-linking agent then ranges generally between 0.1 and 15% by weight, and preferably between 0.5 and 12% by weight in relation to the total weight of the dispersable polyester and of the acrylic (co)polymer in the emulsion.

The polymerization product takes various forms, depending on the nature of the reagents added, and/or the polymerization conditions, and/or the final treatment applied to the product thus obtained. Accordingly, the polymerization products of a non-acidic acrylic monomer with a substantial quantity of polymerizable acid ((meth)acrylic acids, crotonic acid) for example, at least 5% by moles of the total of the polymerizable monomers, may take the form of a true emulsion when the carboxylic acid groups are free or, or they may take the form of more or less viscous, aqueous solutions when the carboxylic groups are neutralized using one of the bases cited above, and, in particular, when using an alkaline base. The viscosity of the dispersions or solutions of modified polymers is not a critical element, and may be adjusted as desired, depending on the needs, by modifying their dry extract content.

The aqueous coating compound may be obtained by the dispersion of an adequate amount of a fluorine-containing polymer in a sufficient quantity of an aqueous solution or dispersion of dispersable polyester, whether modified or not by mixing suitable amounts of an aqueous emulsion or dispersion of a dispersable polymer The dry extract content by weight of the aqueous coating compound is not a critical factor and may vary within broad limits. For practical reasons, the dry extract content of the coating compounds preferably ranges between 5 and 35% by weight.

The content by weight of the coating compounds made of dispersable polyester, whether modified or unmodified, expressed as a function of the fluorine-containing polymer, is calculated so as to confer on the composite film physical-chemical surface properties which make it suitable for use as a temporary support base for plastic films or sheets, and most especially for thermoplastic or cross-linked polyurethane films or sheets. Preferably, the water-dispersable polymer, whether modified or unmodified incorporated into the coating, represents from 5 to 50% by weight of the fluorine-containing polymer. Eventually, this content is chosen so as to ensure at the same time both sufficient adhesion to these sheets or films in the absence of any tractive force and easy detachment when moderate traction is applied. This content, termed effective, depends to a certain extent on the physical-chemical surface properties of the films or sheets requiring a support base. It is also calculated so as to ensure a smooth surface of the coating. In fact, it has been found that the presence of an adequate amount of dispersable polyester makes it possible to obtain a film, free of branching chains, which develop on the surface of the fluorine-containing polymer coating when a dispersable polymer is not present.

Generally speaking, the quantity of dispersable polymer, modified or unmodified, represents between 5% and 50% by weight of the fluorine-containing polymer, and preferably between 10% and 45% by weight.

In addition to the fluorine-containing polymer, which is advantageously combined with the dispersable polymer, the coating compound may contain any additive required for its chemical and/or physical stability. It may thus contain anti-oxidizing, anti-UV, and ionic or non-ionic surface-active agents.

The deposition of the coating on the polyester support film may be achieved using various techniques known to the specialist. Accordingly, the aqueous polymer compound may be deposited by gravity, using a slotted pouring device, by bathing the film in the compound, or again, by using transfer cylinders. The thickness of the layer is controlled by any suitable means. The deposition of the coating may take place either before any film-stretching procedure (on-line coating) or after stretching and either before or after thermosetting (rerun coating). However, preference is given to coating the polyester film before stretching or between two stretching operations.

Before coating, the polyester films may undergo a surface treatment chosen from among those conventionally used, and, more particularly, from among physical treatments. Thus the surface intended to receive the coating may be subjected to electric discharges (corona treatment) or to ionizing radiation. Such treatments are not, however, essential.

The quantity of the aqueous coating compound deposited on the film depends, first, on its dry extract content, and, second, on the thickness desired for the coating of the finished film, i.e., after stretching and thermosetting, when on-line coating takes place. This quantity also depends on the timing of the coating procedure. The variation in thickness of the coating may obviously be considered before and after stretching, when coating takes place before stretching. The thickness of the finished coating may vary within broad limits.

In general, a thickness of the polymer coating of between 0.05 $\mu$m and 0.5 $\mu$m is suitable. It ranges preferably between 0.1 and 0.3 $\mu$m. The quantity of the dry extract deposited on the polyester film to obtain thicknesses of this magnitude range between 0.04 and 0.4 g/m$^2$ preferably between 0.1 and 0.4 gm$^2$.

After coating, the polyester film is heat-treated to remove the water contained in the coating, and, if necessary, to bring about the cross-linking of the dispersable polyester. In the case of on-line coating, it is not generally necessary to undertake thermal treatment; drying and possible cross-linking occur during stretching and thermosetting. One would, however, remain within the scope of the present invention by carrying out, in this case prior to the stretching and thermosetting operations, a thermal treatment sufficient to cause the coalescence of the latex and drying.

The polymer coating may be applied on a single surface or on both surfaces of the polyester support film.

To manufacture, according to the present invention, the polyurethane layer(s) on the polyester support film, this latter must be stretched longitudinally and laterally so as to form a horizontal, flat support base.

To this end, use may advantageously be made of the capabilities of the device described in European Patent Publication Nos. 0 038 760 and 0 131 483, already mentioned.

This device comprises a distributor of the polyester film; means which exert on this strip longitudinal and transverse stresses so as to stretch it and make it as completely flat and horizontal as possible; means for driving this strip in a continuous forward movement; means for depositing at at least one site the liquid mass capable of forming the polyurethane layer on the strip; heating means making it possible to solidify the liquid mass by polymerization of the constituents and/or evaporation of the volatile products; and means which support the strip horizontally over its usable width, at least at the site where the liquid mass is deposited.

According to one embodiment of the device, the means which exert tractive stresses on the polyester support film consist basically of a traction roller positioned at the end of the production line and associated with at least one resistance roller positioned on the "upstream" portion of the line, and casters (termed "edge casters"), which, on both sides and above and beneath the polyester film, apply forces incorporating lateral, outward-directed components. The edge casters may be adjustable; in this case, their angle of inclination in relation to the forward movement of the polyester film, as well as the clamping stresses they generate, may vary.

In one variant, the polyester support film may be stretched laterally using clamps which move simultaneously with and parallel to the strip.

At the end of the pouring production line, means allow the fully-formed sheet to be wound.

In one embodiment of the device, the means used to support the polyester film horizontally over its usable width, i.e., the width covered by the liquid mass at least at the sites where the liquid mass is deposited, may be cylinders arranged at these sites under the polyester film and, if required, at other sites of the apparatus constituting the pouring production line.

In one variant, the means supporting the polyester film horizontally during the pouring operation, at the indicated sites and possibly at others, are advantageously composed of metal or glass plates which are, in turn, supported by suitable means, for example cylinders, or directly by a frame.

This variant proves advantageous, since the plates can simultaneously distribute by conduction, the heat output of the support base by area, while being themselves heated, for example by electric resistors.

When the polyester support film is not used as a storage divider, the pouring production line also comprises means for detaching the sheet from said support base.

To avoid optical defects in the sheet resulting from the presence of foreign bodies, the pouring line may further comprise means preventing dust specks and other particles from being deposited on the support base, especially when this latter is used as a storage divider. It also comprises means for removing any dust specks that may already have been deposited.

The means used to prevent the depositing of particles may be physical screens. Accordingly, the entirety of the pouring line, or sections of it, such as the pouring and solidification areas, may be placed in an enclosure containing filtered air from which dust has been removed.

The means used to prevent the depositing of particles may also be composed of electrostatic bars which ionize the atmosphere surrounding the sheet.

The sheet cleaning means may be brushes, blades acting as scrapers, or wiping elements associated, as needed, with suction devices.

In one variant, the means which support the polyester support film (normally excluding the pouring site(s)), are metal wires stretched between two horizontal bars arranged laterally on each side of the pouring line. These wires may be separated by predetermined distances, which become generally smaller as they approach the "downstream" end of the pouring operation, where the poured material is still in a very liquid state.

One of the advantages of the use of metal wires lies in the fact that friction generated between the pouring support sheet and these wires is virtually eliminated; as a result, the static electricity created, most notably by this friction, is greatly reduced.

Furthermore, these conductive wires are capable of eliminating electric charges.

Another advantage of the use of metal wires lies in the elimination of dust specks which are liable to lodge between the rigid support sheets and the flexible stretched support base, and which can damage this flexible support base or cause surface defects on the poured layers.

In one variant of the device used to manufacture at least one polyurethane layer of high optical quality on a polyester support film, in such a way as to keep the film stretched, use is made of two supports which extend over the functional length of the pouring line and which are placed along they lateral edges of the polyester support film. These supports are associated with tension-generating means allowing the polyester support film to be stretched like the skin of a drum. Means of this kind are described in European Patent Publication No. 0 131 483, already cited.

The preparation of examples of polyester support films used, within the scope of the invention, for the manufacture of polyurethane layers, will now be described. Other features of the invention will become apparent in the course of the following descriptions of exemplary embodiments which are given for illustration of the invention and are not intended to be limiting thereof.

SUPPORT BASE 1

An ethylene glycol polyterephthalate having a viscosity index of 580 and containing 0.4% by weight of calcium carbonate is extruded at a rate of 96 kg/h at a temperature of 275° C. through a slotted feeder 450 mm wide. The ethylene glycol polyterephthalate film is placed in contact with a cooling drum whose surface is kept at 35° C., then stretched longitudinally at 75° C. (at a stretching speed of 20 m/mn and a stretching rate of 3.2). 2 g/m$^2$ of an aqueous dispersion of vinylidene polyfluoride containing 35% by weight of vinylidene polyfluoride is deposited on a single-stretched film using a coating device incorporating successively a levelling roller, a variable-tension roller, a coating cylinder turning at 13 m/mn, and a smoothing bar turning at 7 m/mn. The coated film is then subjected to transverse stretching at 95°–110° C. (rate of 3.7), then thermoset at 225°–235° C. A film μm thick, one surface of which incorporates a vinylidene polyfluoride coating (0.2g of dry extract per m$^2$), is obtained in this manner.

The film was subjected to the measurement of the coefficient of friction of coated surface on coated surface, using the Davenport method according to ASTM Standard D 1894-78 The results were as follows static coefficient of friction $\mu s$: 0.38 dynamic coefficient of friction $\mu d$: 0.33.

The same uncoated film has the following coefficients:

$\mu s$: 0.56

$\mu d$: 0.44

SUPPORT BASE 2

An anti-adhesive composite film is prepared using an on-line coating procedure analogous to that described for Support Base 1, by depositing 2 g/m$^2$ of an aqueous vinylidene polyfluoride dispersion containing 35% by weight of dry extract on one of the surfaces of the single-stretched film obtained by the coextrusion of an ethylene glycol polyterephthalate which contains 0.03% by weight of silica and of a copolyester having a sulfo-5 isophthalate unit, and which has undergone a corona treatment. Coating is carried out using a device of the photo-transfer type, which incorporates an engraved roller having 120 cells 40 μm deep per cm$^2$.

The coated film then undergoes transverse stretching, then thermosetting, as in Example 1 In this way, a coated film 50 μm thick is obtained, incorporating the following:

an inner layer A loaded with silica and having a thickness of 48 μm;

on each surface of layer A, a sulfonated copolyester layer B (thickness: 1 μm);

on one of the sulfonated copolyester layers B, a layer C embodying vinylidene polyfluoride coating deposited at the rate of 0.2 g/m$^2$.

This coated film has the following coefficients of friction:

A. Coated surface on coated surface:

$\mu s$: 65

$\mu d$: 0.47

B. Coated surface on uncoated surface $\mu s$: 0.80

$\mu d$: 0.45

SUPPORT BASE 3

1. Preparation of an aqueous coating compound

To one aqueous vinylidene polyfluoride dispersion containing 35% by weight of dry extract is added, while stirring, a quantity of an aqueous dispersion containing 20% by weight of a sulfonated copolyester, sold under the trade name GEROL PS 20 by the Rhone-Poulenc Chemical Company, this quantity being sufficient to obtain an aqueous dispersion in which the vinylidene polyfluoride represents 31% by weight of the compound, and the sulfonated copolyester, 2.2% by weight (total dry extract equals 33.2% by weight). This copolyester has, for 100 units of dicarboxylic acid, 52 isophthalate units, 36 terephthalate units, and 12 sulfo-5 isophthalate units. Its diethylene glycol content is 13% by weight. It has an average molecular weight of 17,000 and an index of viscosity of 556 measured at 25° C. in a solution of i g of polymer in 100 ml of a phenol/O-ohlorophenol mixture, in a gravimetric ratio of 50/50.

2. Preparation of a coated film

An ethylene glycol polyterephthalate having a viscosity index of 580 and containing 0.4% by weight of calcium carbonate is extruded at a rate of 96 kg/h at a temperature of 275° C. through a slotted feeder 450 mm wide. The ethylene glycol polyterephthalate film is placed in contact with a cooling drum whose surface is kept at 35° C., then stretched longitudinally at 75° C. (at a stretching speed of 20 m/mn and a stretching rate of 3.2). 2 g/m² of an aqueous dispersion of vinylidene polyfluoride containing 35% by weight of vinylidene polyfluoride is deposited on a single-stretched film using a coating device incorporating successively a levelling roller, a variable-tension roller, a coating cylinder turning at 13 m/mn, and a smoothing bar turning at 7 m/mn. The coated film is then subjected to transverse stretching at 95°–110° C. (rate of 3.7), then thermoset at 225°–235° C. A film 36 μm thick, one surface of which incorporates a vinylidene polyfluoride coating (0.2g of dry extract per m²), is obtained in this manner.

The film was subjected to the measurement of the coefficient of friction of the coated surface on the coated surface, using the Davenport method (ASTM Standard D 1894-78). The results were as follows:
static coefficient of friction μs: 0.36
dynamic coefficient of friction μd: 0.33.

The same uncoated film has the following coefficients of friction:
μs: 0.56
μd: 0.44.

SUPPORT BASE 4

An anti-adhesive film is prepared using a non-line coating procedure effected between the longitudinal and transverse stretching procedures on a composite coextruded film composed of a principal ethylene glycol polyterephthalate layer A containing 0.3% by weight of silica, said film bearing on each of its surfaces a layer of an adhesive primary coating having a copolyester base embodying sulfo-5 isophthalates. The single-stretched film undergoes a corona treatment prior to coating. Coating is carried out using a device of the photo-transfer type, which incorporates an engraved roller having 120 cells 40 μm deep per cm².

The coating compound was obtained by adding, while stirring, a sufficient quantity of an aqueous dispersion containing 20% by weight of GEROL PS 20 to 1,000 g of an aqueous suspension containing 35% by weight of vinylidene polyfluoride. The compound thus obtained-contains 28.8% of dry extract (20% vinylidene polyfluoride and 8.8% sulfonated copolyester). The quantity of the aqueous compound deposited is 2 g/m².

The coated film has a thickness of 50 μm and contains 0.2 g/m² of dry extract. It has the following coefficients of friction:

|    | Coated surface/coated surface | Coated surface/uncoated surface |
|----|---|---|
| μs | 0.72 | 0.90 |
| μd | 0.61 | 0.66 |

SUPPORT BASE 5

Preparation of a grafted sulfonated copolyester

Latex containing.45% by weight of dry extract of a grafted sulfonated copolyester is prepared using the polymerization procedure in Example I of European Patent Application No. 0 260 203. For this purpose, a mixture of methyl methacrylate, ethyl acrylate, methacrylic acid, crotonic acid, and vinyl acetate according to the gravimetric proportions set forth in Example I of the above-mentioned patent is polymerized in the presence of the quantity of sulfonated copolymer described for Support Base 3 in the present application, and calculated so that said sulfonated copolyester constitutes 40% by weight of the dry extract of the latex thus obtained.

2. Preparation of a coating compound

To 1,000 grams of the aqueous vinylidene polyfluoride dispersion described for Support Base 3 is added, while stirring, a sufficient quantity of grafted copolymer latex containing 45% by weight of dry extract to obtain an aqueous dispersion in which the vinylidene polyfluoride accounts for 30% by weight and the grafted copolymer, 3% by weight of the total weight of the compound (i.e., a total dry extract of 33%. by weight).

3. Preparation of a coated composite film

An anti-adhesive composite film is prepared by on-line coating of the polyester support film described for Support Base 4 and using the compound previously described, which is deposited at a rate of 2 g/m², in order to obtain a coated film 50 μm thick and incorporating 0.2 g/m² of the anti-adhesive coating.

The film thus produced has the following coefficients of friction:

|    | Coated surface/coated surface | Coated surface/uncoated surface |
|----|---|---|
| μs | 0.74 | 0.79 |
| μd | 0.55 | 0.61 |

SUPPORT BASES 6 AND 7

Using the same procedure as that described for Support Base 5, coated films F1 and F2 were prepared by coating the support film in Example 4 with aqueous dispersions containing and 20%, respectively, by weight of vinylidene polyfluoride and 5.5% and 9%, respectively, by weight of the grafted copolymer described for Support Base 5 (i.e., 31.5 and by weight of dry extract). The films thus obtained have the following coefficients of friction:

|    | Coated surface/coated surface | | Coated surface/uncoated surface | |
|----|---|---|---|---|
|    | μs | μd | μs | μd |
| F1 | 0.71 | 0.59 | 0.62 | 0.56 |
| F2 | 0.70 | 0.59 | 0.73 | 0.53 |

SUPPORT BASE 8

A coated film is prepared by rerun coating of a double-stretched film obtained by coextrusion of an ethylene glycol polyterephthalate containing 0.08% of silica and of a sulfonated copolyester incorporating sulfo-5 isophthalic units. The coextruded film, which has a total thickness of 50 μm, comprises a sulfonated copolyester layer 0.4 m thick on each surface. The surface designed to receive the coating underwent a corona treatment. The aqueous coating compound, which contains 50% by weight of vinylidene polyfluoride and 2.2% by weight of the sulfonated copolyester described for Support Base 3 (i.e., a total of 7.2 g of dry extract) is deposited on the composite film using a photo-engraving coating system equipped with an engraved ceramic roller incorporating 66 lines 66 μm deep per $cm^2$. The film advances forward at a rate of 30 m/mn. The coated film then passes through three drying areas heated to 90, 85, and 60° C. respectively, then travels onto a cooling cylinder.

The film thus obtained, incorporating 0.3 $g/m^2$ of anti-adhesive coating, has the following coefficients of friction:

|  | Coated surface/coated surface |
|---|---|
| $\mu s$ | 0.4 |
| $\mu d$ | 0.3 |

The coefficients of friction of the uncoated film are: $\mu s$: 0 5 and $\mu d$: 0.4.

SUPPORT BASES 9 TO 11

The aqueous latex used was obtained by polymerization (following the procedure described in Example 1 of European Application No. 0 260 203) of vinyl acetate (5% by weight), methyl methacrylate (44.5% by weight), ethyl acrylate (36.5% by weight) methacrylic acid (11% by weight), and N-methylolmethacrylamide (3% by weight), in the presence of the sulfonated copolyester described for Support Base 3 (40% by weight of the total weight of the monomers). The latex thus prepared has a proportion of dry extract equal to 42% by weight and a viscosity at 15% of 34,000 CPS.

Coating compounds were prepared by adding to 1,000 g of aqueous vinylidene polyfluoride containing 35% dry extract, a sufficient quantity of the aqueous latex previously described to obtain coating compounds C1, C2, and C3 having the following compositions:

|  | Vinylidene polyfluoride % by weight | Grafted sulfonated copolyester % by weight |
|---|---|---|
| C1 | 7.5 | 0.75 |
| C2 | 20 | 8.8 |
| C3 | 5 | 2.2 |

By carrying out the procedure described in Example 8, films F1, F2, and F3 were prepared on the coextruded film in Example 8, by depositing 0.45 $g/m^2$, 1.7 $g/m^2$, and 0.4 $g/m^2$, respectively, of dry extract on each film.

The films thus coated have the following coefficients of friction, for coated surface on coated surface:

|  | $\mu s$ | $\mu d$ |
|---|---|---|
| F1 | 0.4 | 0.3 |
| F2 | 0.4 | 0.3 |
| F3 | 0.4 | 0.3 |

The support bases previously described are used as support bases for the manufacture of the polyurethane layers, as illustrated in the following examples.

The polyurethane layers producible according to the invention are described, for example, in French Patent Publication No. 2 398 606 and European Publications 0 132 198, 0 133 090, and 0 190 517.

When one wishes to manufacture a double-layered sheet that can be used as a safety window, such as the one described in European Patent No. 0 132 198, fabrication is first made of a first layer that may be either the adhesive, energy absorbing layer (EA layer) or the thermo-hardenable layer. The second layer is formed on this first layer.

Thus, a thermo-hardenable polyurethane layer may first be manufactured by pouring the mixture of constituents on the pouring support base. After polymerization of the monomers and the formation of a thermo-hardenable layer whose thickness may range, for example, from 0.1 to 0.8 mm, the reactive mixture of the constituents for the EA layer is poured.

The procedure may also be reversed; i.e., by first forming the energy-absorbing layer (EA layer).

Of course, a sheet incorporating more than two layers may be produced, in particular a sheet containing three layers: a first polyurethane layer having surface properties (termed the self-healing layer or thermo-hardenable layer); a second, polyurethane layer having energy-absorbing properties; and a third, thermoplastic layer having adhesive properties. In one variant, the adhesive layer may be manufactured first, then the energy-absorbing layer, and finally, the surface-properties layer.

EXAMPLES 1 TO 11

A homogeneous mixture of the following constituents is poured on the support bases 1 to 11 previously described:

1,000 g of a polyether having a molecular weight of approximately 450, obtained by oxide condensation of 1,2-propylene with 2,2-bis(hydroxymethyl)-1-butanol and having a free hydroxyl radical content of approximately 10.5 to 12%, containing 1% by weight of a stabilizing agent, 0.5% by weight of a catalyst (i.e., dibutyltin dilaurate), and 0.1% of a coating;

1,020 g of a biuret of 1,6-hexanediisocyanate having a free isocyanate radical content of approximately 23.2%.

A pouring head such as the one described in French Patent Publication No. 2 347 170 is used. A uniform layer is produced which, after polymerization and when heated (e.g., 15 minutes at 120° C.), has a thickness of approximately 0.19 mm and self-healing properties.

To manufacture the layer possessing energy-absorbing properties, the polyalcohol constituent is preliminarily prepared by mixing a polytetramethylene glycol having a molar mass of 1,000 with butanediol-1,4 and a polycaprolactonetriol, the proportions of these three constituents being such that the polytetramethylene glycol contributes a hydroxyl group equivalent of 0.35, while the butanediol-1,4 contributes 0.55 and the triol, 0.10.

A stabilizing agent in the proportion of 0.5% by weight of the total weight of the polyalcohol and isocyanate constituents, a coating agent in the proportion of 0.05% by weight calculated in the same manner, and a catalyst, i.e., dibutyltin dilaurate in the proportion of 0.02% by weight, calculated in the above-mentioned manner.

The isocyanate constituent is 3-isocyanato-methyl,5,5trimethylcyclohexylisocyanate (IPDI) having urea functions obtained by partial hydrolysis of the IPDI and having an NCO-group content of approximately 31.5% by weight.

The constituents are incorporated in amounts such that the NCO/OH ratio is 1.

After degassing the constituents in a vacuum, the mixture, which is heated to approximately 40° C., is poured using a pouring head like the one described in French Patent Publication No. 2 347 170 onto the self-healing polyurethane, layer previously formed. Thus a layer approximately 0.60 mm thick is formed and subjected to a polymerization cycle consisting of 25 minutes of heating at approximately 120° C.

The double-layered sheet is detached from the polyester support base. It can be easily handled, stored, or used immediately afterward for the fabrication of laminated windows.

The sheet possesses the optical quality required for use in a safety window.

EXAMPLES 12 TO 22

The procedure used for Examples 1 to 11 is repeated, except that, to form the self-healing polyurethane layer, a homogeneous mixture containing the following constituents is poured:

942 g of a trifunctional polycaprolactone having a free OH radical content of 9.3% by weight and containing 0.015% by weight of dibutyltin dilaurate, 0.1% by weight of a fluoroalkylated ester as a dispersion agent, and 1% by weight of a UV-protection agent; and 1,000 g of a 1,6-hexamethylenediisocyanate-based triisocyanurate having a free NCO radical content of 21.5% by weight.

The layer is polymerized under heat, for example for 15 minutes at 120° C.

The energy-absorbing layer is then manufactured.

The double-layered sheet is detached from the support base. It possesses the optical quality required for use in safety windows.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for forming a plastic sheet, comprising at least one polyurethane layer of high optical quality, one an anti-adhesive polyester film support base comprising the steps of:
depositing at least one liquid mass of polyurethane on a movable horizontal flat stretched anti-adhesive polyester film support base, wherein said polyester film is composed of a film having a semicrystalline orientation; and
comprising on at least the surface of said film which receives said liquid mass, a coating comprising
a) one fluorine-containing polymer; and
b) a water-dispersible polyester derived from at least one aromatic dicarboxylic acid and at least one diol, and containing a multiplicity of sulfonyloxy groups corresponding to the general formula:

$$(SO_3)_nM, \qquad (I)$$

where
n is equal to 1 or 2; and
M represents one hydrogen atom, one alkali or alkaline-earth metal, an ammonium cation or a quaternary ammonium cation.

2. The method of claim 1, wherein said deposition of at least one liquid mass is repeated such that a polyurethane layer possessing self-healing properties, a polyurethane layer having energy-absorbing properties and a thermoplastic polyurethane layer possessing adhesive properties are deposited on said polyester film support.

3. The method of claim 1, wherein said liquid mass of polyurethane is a reactive mixture of polyurethane constitutes.

4. The method of claim 1, wherein said liquid mass of polyurethane is a reactive mixture of polyurethane constituents which form a layer possessing energy-absorbing properties.

5. The method of claim 1, wherein the step of deposition of said at least one liquid mass of polyurethane is followed by deposition of a second liquid mass wherein one liquid mass is a thermo-hardenable polyurethane layer and said second liquid mass is a polyurethane layer possessing energy-absorbing properties.

6. The method of claim 1, wherein the oriented polyester support film is composed of a polymer comprising at least 80% in moles of units derived from at least one aromatic dicarboxylic acid and from ethylene glycol.

7. The method of claim 1, wherein the oriented polyester support film is composed of a polymer containing at least 80% in moles of ethylene glycol terephthalate or ethylene glycol naphthalene-decarboxylate units.

8. The method of claim 1, wherein the oriented polyester support film has thickness ranging between 20 and 200 μm.

9. The method of claim 1, wherein the oriented polyester support film additionally has, on the surface receiving said liquid mass, a primary adhesive coating.

10. The method of claim 9, wherein the primary adhesive coating is composed of a sulfonated copolyester.

11. The method of claim 1 wherein the surface of said support film which receives the anti-adhesive coating is subjected to corona treatment before coating.

12. The method of claim 1, wherein the dispersable polyester is a copolyester comprising a multiplicity of units derived from at least two dicarboxylic acids, of which one contains at least one sulfonyloxy group in its molecule and a multiplicity of units derived from at least two dicarboxylic acids, of which one contains at least one sulfonyloxy group in its molecule and a multiplicity of units derived from at least one aliphatic diol.

13. The method of claim 12, wherein the number of units derived from a dicarboxylic acid containing a sulfonyloxy group for a total of 100 mols derived from dicarboxylic acids, ranges from 2 to 30 moles %.

14. The method of claim 1, wherein the dispersable polymer is a copolyester comprising a multiplicity of units derived from at least one non-sulfonated dicarboxylic acid chosen from the group of terephthalic, isophthalic, and phthalic acids.

15. The method of claim 1, wherein the dispersable polyester is a copolymer containing a multiplicity of units derived from terephthalic and isophthalic acids.

16. The method of claim 13, wherein the dispersable polyester is a copolyester in which the number of terephthalate units represents from 20 to 99% of the total number of terephthalate and isophthalate units.

17. The method of claim 1, wherein the water-dispersable polyester comprises a multiplicity of units derived from sulfo-5 isophthalic acid.

18. The method of claim 1, wherein the dispersable polyester comprises a multiplicity of units derived from at least one aliphatic diol from the group containing ethylene glycol and its oligomers corresponding to the formula $HO-(CH_2-CH_2-O-)_nH$, in which n is a whole number between 1 and 10.

19. The method of claim 1, wherein the dispersable polyester has been modified by grafting at least one acrylic monomer.

20. The method of claim 1, wherein the acrylic monomer corresponds to the general formula:

where:
R represents one hydrogen atom, a lower alkyl group, or a lower alkyl group substituted with a hydroxyl group;
Y represents a functional hydroxycarbonyl alkoxycarbonyl group corresponding to the formula $-COOR_1$, in which $R_1$ is $C_{1-20}$ linear alkyl, hydroxyl substituted $C_{1-20}$ linear alkyl, $C_{1-20}$ branched alkyl or hydroxyl substituted $C_{1-20}$ branched alkyl; nitrile; amide having the formula $-CON(R_2)(R_3)$, wherein $R_2$ and $R_3$ are each independently an atom of hydrogen or a linear or branched alkyl group containing from 1 to 20 carbon atoms.

21. The method of either of claims 19 or 20, wherein the acrylic monomer is selected from the group consisting of methyl acrylate and methacrylate, ethyl acrylate and methacrylate, acrylic and methacrylic acids, and acrylamide and methacrylamide.

22. The method of claim 19, wherein a small quantity of one or several non-acrylic ethylenic monomers are associated with the acrylic monomer.

23. The method of claim 19, wherein at least one cross-linking monomer is combined with acrylic monomers corresponding to formula (II):

where:
R represents one hydrogen atom, a lower alkyl group, or a lower alkyl group substituted with a hydroxyl group;
Y represents a functional hydroxycarbonyl alkoxycarbonyl group corresponding to the formula $-COOR_1$, in which $R_1$ is $C_{1-20}$ linear alkyl, hydroxyl substituted $C_{1-20}$ linear alkyl, $C_{1-20}$ branched alkyl or hydroxyl substituted $C_{1-20}$ branched alkyl; nitrile; amide having the formula $-CON(R_2)(R_3)$, wherein $R_2$ and $R_3$ are each independently an atom of hydrogen or a linear or branched alkyl group containing from 1 to 20 carbon atoms.

24. The method of claim 23, wherein the quantity of cross-linking monomer represents up to 5% in moles of the acrylic monomer corresponding to formula (II).

25. The method of claim 23, wherein the cross-linking monomer is a polyethylenic monomer.

26. The method of claim 23, wherein the cross-linking monomer is a hydroxyalkyl(meth)acrylamide.

27. The method of claim 19, wherein the modified dispersable polyester contains from 0.1 to 15% by weight of at least one external cross-linking agent selected from the group consisting of formo-phenolic resins and amine-formol resins.

28. The method of claim 1, wherein the fluorine-containing polymer is selected from the group consisting of the polymers and copolymers of vinylidene polyfluoride, of trifluorochloroethylene, of tetrafluorochloroethylene, and of hexafluoropropylene.

29. The method of claim 28, wherein the fluorine containing polymer is selected from the group consisting of polymers and copolymers of vinylidine polyfluoride, of trifluorochloroethylene, of tetrafluorochloroethylene of hexafluoropyropylene and with non-fluorine-containing monomers.

30. The method of claim 1, wherein the quantity of the water-dispersable polymer, whether modified or unmodified, incorporated into the coating, represents from 5% to 50% by weight of the fluorine-containing polymer.

31. The method of claim 1, wherein the quantity of coating expressed in grams of dry extract per $m^2$ of oriented support film ranges between 0.1 and 0.4 $g/m^2$.

* * * * *